United States Patent [19]

Brandt et al.

[11] 4,295,384
[45] Oct. 20, 1981

[54] BALL NUT AND SCREW ASSEMBLY WITH TRAVEL LIMIT STOP

[75] Inventors: Howard C. Brandt, Saginaw; Leonard R. Grabowski, Bay City, both of Mich.

[73] Assignee: General Motors Corporation, Detroit, Mich.

[21] Appl. No.: 74,960

[22] Filed: Sep. 13, 1979

[51] Int. Cl.³ .................. F16H 1/08; F16H 27/02; F16H 29/20

[52] U.S. Cl. .................. 74/424.8 NA; 74/89.15; 411/259

[58] Field of Search .................. 151/31; 74/424.8 R, 74/424.8 NA, 459, 441, 89.15

[56] References Cited

U.S. PATENT DOCUMENTS

| | | | |
|---|---|---|---|
| 1,755,245 | 4/1930 | Elias | 151/31 |
| 2,356,861 | 8/1944 | Link | 74/424.8 R |
| 2,446,393 | 8/1948 | Russell | 74/424.8 R |
| 2,497,424 | 2/1950 | Terdina et al. | 74/424.8 R |
| 2,675,712 | 4/1954 | Speth | 74/459 |
| 2,842,007 | 7/1958 | Brant | 74/441 |
| 2,936,645 | 5/1960 | Morris et al. | 74/441 |
| 2,944,437 | 7/1960 | Pickles | 74/424.8 R |
| 3,029,660 | 4/1962 | Sears | 74/424.8 R |
| 3,037,397 | 6/1962 | Allen et al. | 74/424.8 R |
| 3,178,957 | 4/1965 | Martens | 74/424.8 R |
| 3,200,664 | 8/1965 | Mauric | 74/424.8 R |
| 3,399,581 | 9/1968 | Valenti et al. | 74/424.8 R |
| 3,732,744 | 5/1973 | Rowland | 74/424.8 R |
| 4,074,585 | 2/1978 | Richaud et al. | 74/424.8 R |
| 4,179,944 | 12/1979 | Conner | 74/89.15 |

FOREIGN PATENT DOCUMENTS 19623 of 1911 United Kingdom .................. 151/31

Primary Examiner—C. J. Husar
Assistant Examiner—Conrad Berman
Attorney, Agent, or Firm—Charles R. White

[57] ABSTRACT

This ball nut and screw assembly has a ramplike stop secured to screw shaft. On predetermined linear movement of the ball nut relative to the screw shaft, the balls contained in the ball nut are forced to climb the ramp and are compressively loaded to force radial expansion of the nut and to positively limit ball nut travel. The wedging effect provided by the stop requires additional power to continue movement which cannot be fulfilled by the input.

6 Claims, 6 Drawing Figures

BALL NUT AND SCREW ASSEMBLY WITH TRAVEL LIMIT STOP

This invention relates to a ball nut and screw assembly incorporating a travel limiter which places the ball nut in a hoop stress condition to limit the extent of axial travel of the ball nut on the screw shaft.

Prior to the present invention, various auxiliary stop mechanisms have been employed on ball nut and screw assemblies to limit the travel of the ball nut on the screw shaft. Generally, such mechanisms incorporate stop washers or stop pins mounted at a predetermined station on the ball nut screw to axially contact the end of the ball nut housing to establish the travel limit. While these and other prior devices provided effective travel stops they generally did not fully utilize components of the ball nut and screw and provide radially loaded stops.

In this invention a high capacity stopping arrangement is provided for a ball nut and screw which positively prevents the ball nut from disengaging the screw at the point of the stop. In this invention improved ramping devices are provided which act through the balls to place the ball nut in a hoop stress condition and the ramp in a combination of compression, torsion and sheer to provide a highly effective travel limiter. More specifically, as the ball nut travels linearly on the screw, the balls or the ball deflector are forced to climb a ramp while being contained in the ball nut. Under such conditions the balls and deflectors are compressed to force the ball nut to expand radially outwardly. This wedging effect requires considerable power to continue movement. Since the hydraulic motor or other actuators generally employed with ball nut and screw assemblies will not have sufficient power to continue this movement, the motor will stall out and the motion will stop. If desired, a sheer pin or other safety means could also be used in place of motor stall out.

It is a feature, object and advantage of this invention to provide a new and improved ball nut and screw assembly which incorporates ramping construction secured at a predetermined position along the length of the screw shaft of the assembly on which the balls circulated in the nut are forced to climb when the nut travels past the leading end of the ramp so that a progressively increasing wedging effect is provided to positively limit ball nut travel.

Another feature, object and advantage of this invention is to provide a new and improved ball nut and screw assembly featuring a ball nut stop on the screw utilizing ramping construction in combination components of the ball nut and screw for progressively increasing stopping capacity with ball nut travel and in which the balls of the ball nut are compressively loaded and the body of the nut are radially stressed to limit relative ball nut and screw travel.

Another feature, object and advantage of this invention is to provide a new and improved ball nut and screw assembly incorporating a travel limiter formed by a wedging device carried by the screw to act on the balls circulated in the nut when the ball nut and screw relatively travel to a predetermined station to radially stress the ball nut to a point where no further relative movement between the ball nut and screw is possible.

Figure 1:
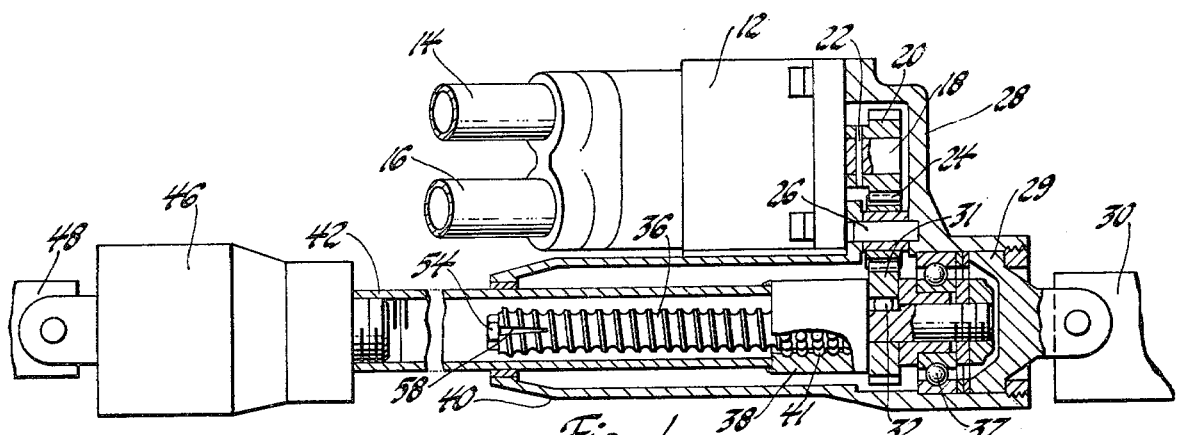
FIG. 1 is a longitudinal view partially in section and partly in elevation with certain parts broken away of an actuator incorporating this invention.

With reference to FIG. 1 of the drawing, there is illustrated a hydraulic motor 12 having inlet and outlet hydraulic lines 14 and 16 respectively for connection to a reversing hydraulic valve not shown. It is to be appreciated that the use of a hydraulic drive is only exemplary since the concepts disclosed in this specification are applicable to other power sources. The motor includes a rotary output shaft 18 to which an output spur gear 20 is attached by a sheer pin 22.

The spur gear 20 meshes with an idler gear 24 journaled on a stub shaft 26 carried by a housing 28 secured to the end of the motor 12. A connector 29 secured in the housing 28 extends therefrom into attachment with a stationary base member 30 or other support. The idler gear 24 meshes with a spur gear 31 keyed at 32 to rotatably drive an axially extending screw shaft 36 rotatably mounted in bearing 37 in the housing.

A ball nut 38 having deflectors to deflect the balls 41 as they circulate in the nut is operatively mounted on screw shaft 36 for linear movement therealong in response to rotation of the screw shaft by the hydraulic motor and the interconnecting gear train. This ball nut and screw assembly is preferably of steel material and similar in construction to that of U.S. Pat. No. 2,505,131 issued to R. P. Means, Apr. 25, 1950, the disclosure of which is hereby incorporated by reference.

The housing 28 has an elongated tubular sleeve 40 which is disposed around a portion of and slidably supports a tubular output shaft 42. The output shaft 42 is attached to and extends outwardly from the outboard end of the ball nut 38. As shown, the screw shaft 36 has a conventional helical groove to provide a track for the train of balls of the ball nut 38. The ball train circulates in the endless passage provided by the ball nut and screw in response to rotation of the screw to drivingly interconnect these elements to effect the linear movement of the ball nut and output shaft 42. Threaded into the outer end of the output shaft is a connector 46 which is attached to a load 48 that moves axially along with the output shaft 42 upon rotation of the screw shaft on operation of the hydraulic motor.

Figure 2:
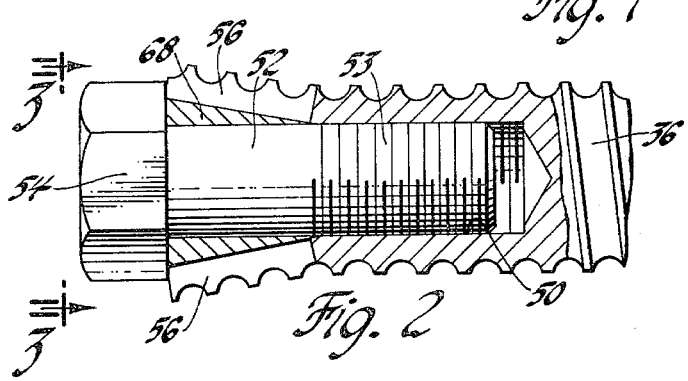
FIG. 2 is a longitudinal view partly in section and partly in elevation of a portion of the screw of FIG. 1.
Figure 3:
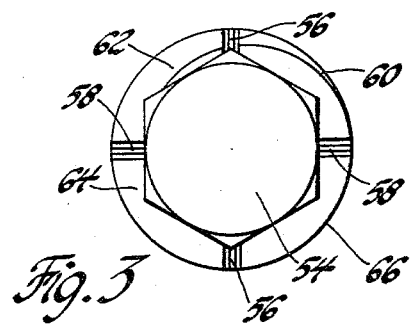
FIG. 3 is an end view taken along line 3—3 of FIG. 2.

As best shown in FIG. 2, the end of the screw shaft has an internally threaded bore 50 formed therein for reception of a bolt member 52 which has a partially threaded shank 53 and a hexagonal head 54 on the outer end to accommodate suitable tooling so that the bolt member can be readily threaded into and out of the bore 50. The end of the screw shaft 36 is cross cut at 56 and 58 as best shown in FIG. 3 to form arcuate segments 60, 62, 64 and 66. These segments are ramped radially outwardly at the free end of the shaft as shown in FIG. 2 by an annular tapered bushing 68 which is fitted on the unthreaded shank portion of the bolt 52. When the bolt is threadedly advanced from a starting position into the bore 50, the head 54 of the bolt drives the bushing into the bored end of the screw. The tapered bushing 68 entering this bore, forces the segments into an inclined attitude as determined by the slope of the bushing to provide a positive axial stop for the ball nut of the actuator.

In operation, assuming that the motor 12 rotatably drives the screw shaft in a direction to linearly displace the ball nut 36 and the attached output shaft outwardly from the housing 28, the ball nut will advance and the ramped arcuate segments 60, 62, 64 and 66 will be encountered by the ball deflectors or the balls of the ball nut 36. As the ball nut continues to move outwardly, it is placed in hoop stress by the deflectors and balls while the ramped segments are loaded in compression, torsion and sheer. This occurs until the motor stalls or the pin 22 fractures. In any event, the ball nut and the cooperating ramped arcuate segments positively limit the outward linear movement of the nut and the output shaft and prevents the nut from running off of the end of the screw shaft. Since the ball nut cannot travel past the arcuate segments, the assembly is maintained for subsequent high efficiency travel along the screw shaft and with noise free operation. In the event that the screw shaft is turned in a reverse direction by hydraulic motor operation, the ball nut will be backed from the ramped section onto the operating section of the screw shaft.

Figure 4:
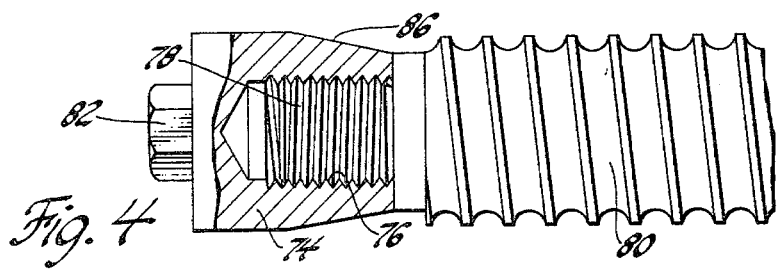
FIGS. 4, 5, and 6 are views similar to the view of FIG. 2 showing modifications of the present invention.

FIG. 4 shows an alternate embodiment of the invention which includes a coned stop member 74 having an internally threaded axial bore 76 that is threaded onto an axially extending shank or reduced diameter end 78 of the screw shaft 80. The lead of the thread of the threaded end portion of the screw is opposite to the lead of the helical groove in the screw shaft so that the ball nut utilized with this embodiment will not tend to back the stop member 74 off of shank 78 when contact is made. The construction of the screw shaft 80 and the ball nut of this embodiment otherwise corresponds to that of the first embodiment. The stop member 74 has an axially extending hexagonal head 82 to accommodate tooling so that the stop member can be easily installed on the end of the screw shaft in abutment with the outboard end thereof. Stop member 74 as shown in FIG. 4 has a conical surface 86 which inclines outwardly from the end turn of the helical groove of the screw shaft. As in the first embodiment, this design forces the balls and the deflector to climb a ramp while being contained in the ball nut, thus compressing the balls and deflectors and forcing the ball nut to expand outwardly. As in the first embodiment, the radial wedging effect requires considerable additional power to continue movement. Since the motor is selected to have insufficient power to continue this movement, the motor will stall out and the motion will stop. If desired, a sheer pin such as pin 22 or other safety means could be used in place of or in addition to motor stall out.

Figure 5:
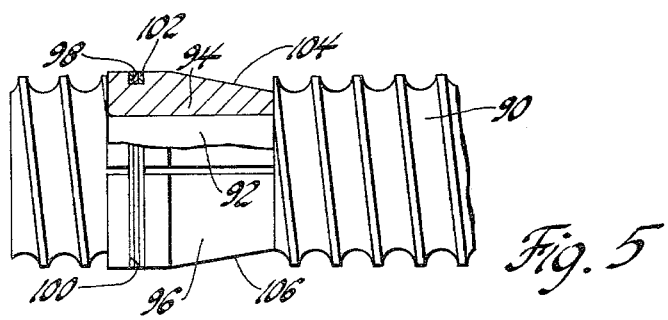

Another embodiment of this invention is shown in FIG. 5 in which a ramp type limit stop is installed intermediate the ends of a ball nut screw. In this embodiment, a screw shaft 90 corresponds to the screw shafts 80 and 36 of the embodiments of FIGS. 2 and 4 and the ball nut is the same as ball nut 36. The screw shaft 90 is formed with a reduced diameter portion 92 on which two tapered "C" collars 94 and 96 are mounted. These collars have aligned grooves 98 and 100 which receive suitable retaining rings 102 that hold the collars in place on the screw shaft. The collars 94 and 96 have inclined ramping surfaces 104 and 106 which provide a positive stop for the ball nut used with this embodiment functioning with increasing stopping capacity with linear movement of the ball nut on the ramped portions as in the other embodiments.

Figure 6:
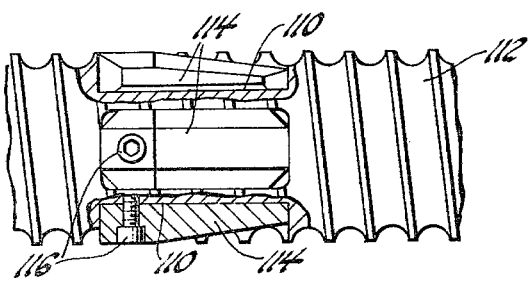

FIG. 6 illustrates a fourth embodiment of the invention in which a plurality of arcuately spaced pockets 110 are formed in the body of the screw shaft 112 at a selected position intermediate the ends thereof. Ramped stops 114 are secured in these pockets by screws 116. The stops present a gradually increasing gradient which the balls of the ball nut are forced to climb. The action is similar to that of the first embodiment that positively prevents the movement of the ball nut past the stops 114.

This invention is not limited to the details of the construction and method shown and described for purposes of illustrating the invention for other modifications and methods falling within the scope of the appended claims which will occur to those skilled in the art.

The embodiments of the invention in which an exclusive property or privilege is claimed are defined as follows:

1. In a ball screw assembly, the combination of an elongated screw having helical ball groove means therein, a ball nut member operatively mounted for movement relative to said screw having helical ball groove means therein which matches the groove means of said screw and cooperates therewith to form a helical ball track, a train of balls operatively mounted in said track to drivingly interconnect said nut member and said screw, ball return means supported by said ball nut member for circulating said balls between opposite end turns of said track, and fixed radially extending stop means disposed in a predetermined position on said screw to provide outwardly inclined ramp means for acting on said balls of said train to progressively force said balls outwardly and radially against the inner surface of said ball nut member forming a portion of said ball groove means therein as said ball nut member progressively moves onto said ramp means to thereby place said ball nut member in hoop stress to prevent said ball nut from traveling past said stop means and thereby provide a limit stop for said assembly.

2. A ball nut and screw assembly comprising an elongated screw having a helical ball groove means therein, a ball nut member operatively mounted for movement relative to said screw and having helical ball groove means therein which matches the groove means of said screw and cooperates therewith to form a helical ball track, a train of balls operatively mounted in said track to drivingly interconnect said nut member and said screw, ball return means supported by said nut member for circulating said balls between opposite end turns of said track, and fixed outwardly extending ramp means disposed in a predetermined position on said screw to force said balls outwardly into increasing wedging engagement with a portion of said groove means of said nut member as said ball nut member progressively moves linearly onto said ramp means to thereby place said ball nut member in hoop stress to prevent said ball nut member from traveling past said ramp means.

3. The ball nut and screw assembly of claim 2 wherein said ramp means is formed by a plurality of arcuate segments integral with and inclined outwardly from one end of said screw and means secured in said screw for forcing said segments into a predetermined inclination.

4. The ball nut and screw assembly of claim 2 wherein said ramp means is provided by a cylindrical member with a conical surface formed thereon, and means securing said cylindrical member secured to an end portion of said screw.

5. The ball nut and screw assembly of claim 2 wherein said ramp means is formed by a pair of matching "C" shaped collars with inclined surfaces formed thereon, and means securing said collars together in a predetermined position intermediate the ends of said screw.

6. The ball nut and screw assembly of claim 2 wherein said ramp means is formed by a plurality of ramps arcuately spaced from one another and secured in pockets formed in said screw.

* * * * *